United States Patent [19]

Nakamura et al.

[11] Patent Number: 5,360,089
[45] Date of Patent: Nov. 1, 1994

[54] AUTOMOTIVE SUSPENSION CONTROL SYSTEM UTILIZING VARIABLE DAMPING FORCE SHOCK ABSORBER

[75] Inventors: Michiya Nakamura; Shinobu Kakizaki, both of Atsugi, Japan

[73] Assignee: Unisia Jecs Corporation, Japan

[21] Appl. No.: 62,746

[22] Filed: May 18, 1993

[30] Foreign Application Priority Data

May 21, 1992 [JP] Japan .................. 4-128898

[51] Int. Cl.⁵ .............. B60G 17/015; F16F 9/46; F16K 31/04
[52] U.S. Cl. .................. 188/299; 188/319; 188/322.15; 280/707; 251/129.13
[58] Field of Search ........... 188/282, 285, 299, 319, 188/322.15; 280/707; 364/434; 251/129.11-129.13; 318/685, 696

[56] References Cited

U.S. PATENT DOCUMENTS

| | | | |
|---|---|---|---|
| 4,054,649 | 8/1991 | Murakami | 318/685 X |
| 4,508,142 | 4/1985 | Eburn, Jr. et al. | 251/129.11 X |
| 4,645,043 | 2/1987 | Imaizumi | 188/322.15 X |
| 5,100,101 | 3/1992 | Shah | 251/129.12 X |

FOREIGN PATENT DOCUMENTS

6440712  3/1989  Japan .

*Primary Examiner*—Andres Kashnikow
*Assistant Examiner*—Alfred Muratori
*Attorney, Agent, or Firm*—Ronald P. Kananen

[57] ABSTRACT

A suspension control system for an automotive vehicle is provided which utilizes variable damping force shock absorbers for modifying damping force characteristics. Each of the shock absorbers has an electric motor adapted for varying an effective fluid flow restriction established by an orifice when modifying the damping force characteristics. When the electric motor is energized to initialize an angular position thereof upon starting the suspension control, operating torque of the motor is decreased below a preselected level for reducing reaction force from a stopper when an output shaft of the motor is urged into engagement with the stopper arranged at an original angular position of the motor.

5 Claims, 11 Drawing Sheets

FIG.16(A) DRIVING SIGNAL
FIG.16(B) OPERATING CURRENT
FIG.16(C) STOPPING POSITION

AUTOMOTIVE SUSPENSION CONTROL SYSTEM UTILIZING VARIABLE DAMPING FORCE SHOCK ABSORBER

BACKGROUND OF THE INVENTION

1. Field of the Invention

The present invention relates generally to a suspension control system for an automotive vehicle which utilizes variable damping force shock absorbers for suppressing vehicle attitude change. More particularly, the invention relates to an improved arrangement which initializes an angular position of an electric motor adapted for modifying damping force characteristics of a variable damping force shock absorber.

2. Description of the Prior Art

Japanese Utility Model First Publication No. 64-40712 discloses an automotive suspension control system which includes variable damping force shock absorbers for suppressing vibrations causing vehicular attitude change. This conventional suspension control system features an arrangement which initializes an angular position of an electric motor adapted for modifying damping force characteristics of the shock absorber when vibrations between wheels and a vehicle body are controlled below a preselected level. The initialization of the electric motor is accomplished by rotating an output shaft of the motor into engagement with a stopper which is arranged at a preselected original angular position.

The above prior art suspension control system, however, has a drawback in that when the output shaft of the electric motor is urged against the stopper, it may be returned beyond the original angular position due to a reaction force from the stopper, resulting in a decreased angular positioning accuracy of the motor.

SUMMARY OF THE INVENTION

It is therefore a principal object of the present invention to avoid the disadvantages of the prior art.

It is another object of the invention to provide an improved arrangement which initializes an angular position of an electric motor with high accuracy which is adapted for controlling damping force characteristics of a variable damping force shock absorber.

According to one aspect of the present invention, there is provided a suspension control system for an automotive vehicle which comprises a shock absorber disposed between a vehicle body and a suspension member rotatably supporting a wheel, the shock absorber being controllable to assume damping force characteristics in a range between preselected higher and lower damping coefficients over extension and compression strokes, an adjusting member which is disposed in the shock absorber and movable for modifying the damping force characteristics of the shock absorber, a motor providing driving torque of a preselected operating level to the adjusting member to move the adjusting member for modifying the damping force characteristics, a stopper restricting the movement of the adjusting member at a preselected position when the motor is initialized, and a motor driving controlling means for controlling the driving torque provided from the motor to the adjusting member, the motor driving controlling means reducing the driving torque to a level lower than the preselected operating level when the motor is initialized.

In the preferred mode, the motor includes a step motor. The motor driving controlling means provides a plurality of pulse trains for rotating the step motor into engagement with the stopper when the step motor is initialized. The reduced driving torque during the initializing operation of the step motor may be maintained for a preselected first period of time after each output of the pulse train is stopped. After the first period of time, the reduced driving torque is further decreased to about zero for a preselected second period of time.

With the above arrangements, when the step motor is initialized, the driving torque of the step motor is reduced to a level lower than the operating level, thereby decreasing reaction force acting on the adjusting member from the stopper to within a range assuring allowable positioning accuracy.

BRIEF DESCRIPTION OF THE DRAWINGS

The present invention will be understood more fully from the detailed description given hereinbelow and from the accompanying drawings of the preferred embodiments of the invention. However, the drawings are not intended to a imply limitation of the invention to specific embodiment, but are for explanation and understanding only.

In the drawings:

FIG. 7(a) is a cross-sectional view taken along the line K—K in FIG. 4 which shows an adjusting pin at a position ① in FIG. 10.

FIG. 7(b) is a cross-sectional view taken along the lines L—L and M—M in FIG. 4 which shows an adjusting pin at a position ① in FIG. 10.

FIG. 7(c) is a cross-sectional view taken along the line N—N in FIG. 4 which shows an adjusting pin at a position ① in FIG. 10.

FIG. 8(a) is a cross-sectional view taken along the line K—K in FIG. 4 which shows an adjusting pin at a position ② in FIG. 10.

FIG. 8(b) is a cross-sectional view taken along the lines L—L and M—M in FIG. 4 which shows an adjusting pin at a position ② in FIG. 10.

FIG. 8(c) is a cross-sectional view taken along the line N—N in FIG. 4 which shows an adjusting pin at a position ② in FIG. 10.

FIG. 9(a) is a cross-sectional view taken along the line K—K in FIG. 4 which shows an adjusting pin at a position ③ in FIG. 10.

FIG. 9(b) is a cross-sectional view taken along the lines L—L and M—M in FIG. 4 which shows an adjusting pin at a position ③ in FIG. 10.

FIG. 9(c) is a cross-sectional view taken along the line N—N in FIG. 4 which shows an adjusting pin at a position ③ in FIG. 10.

DESCRIPTION OF THE PREFERRED EMBODIMENT

Figure 1:
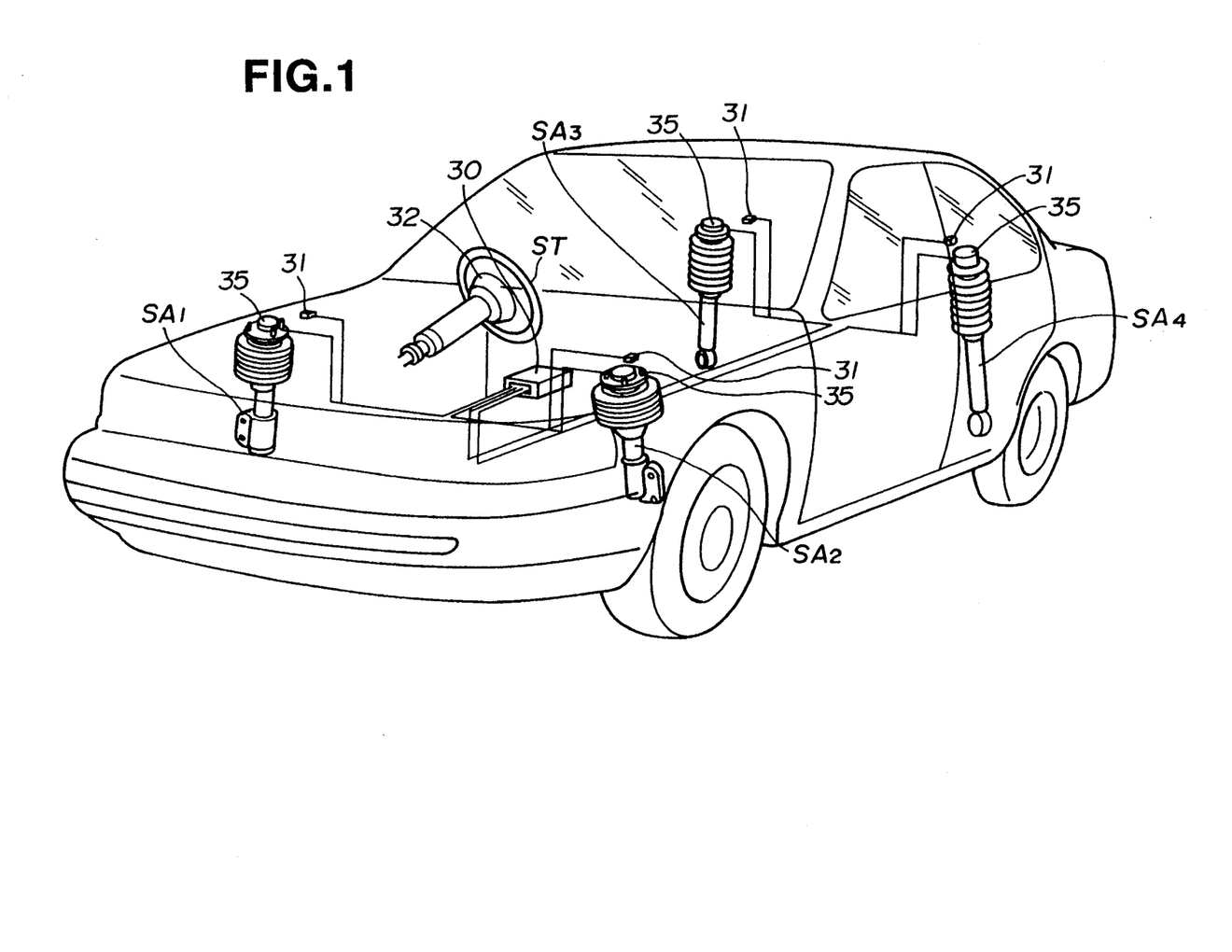
FIG. 1 is a perspective view which shows an automotive vehicle incorporating a suspension control system according to the present invention.
Figure 2:
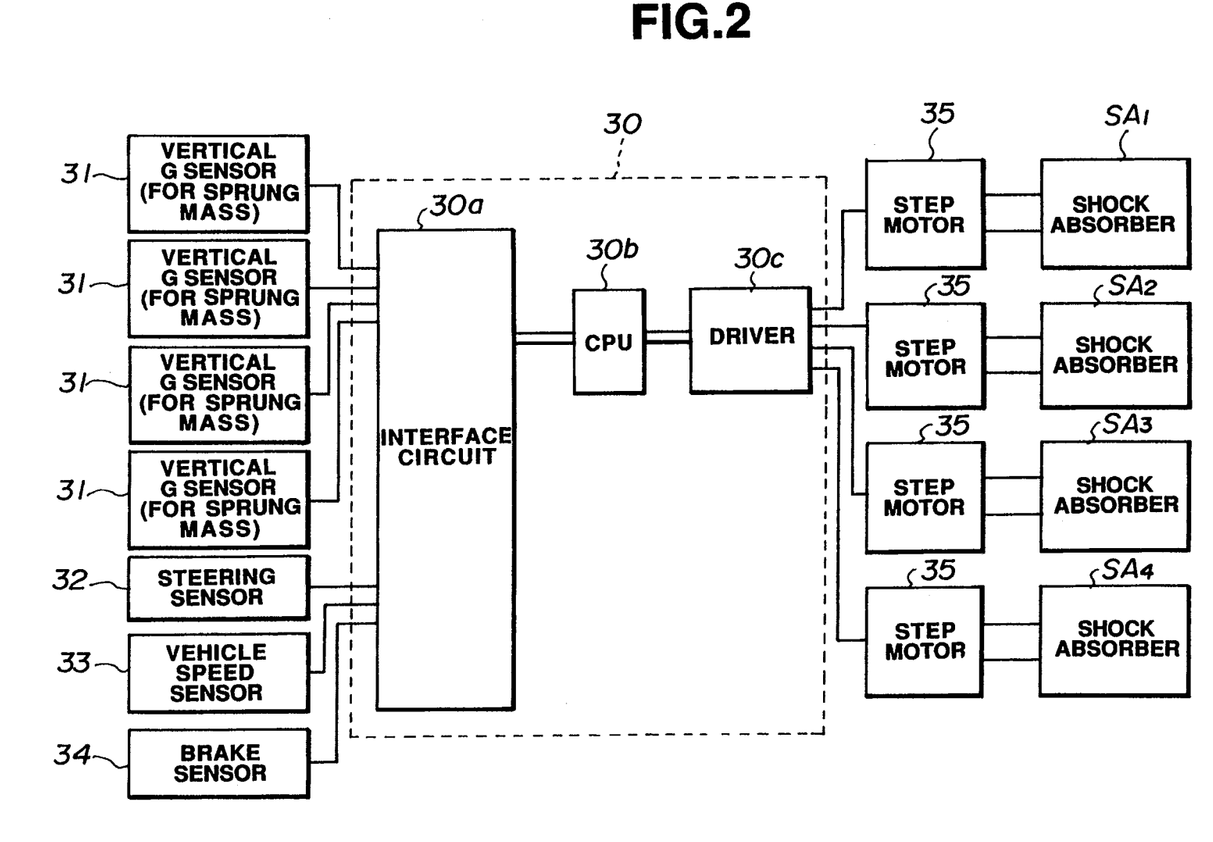
FIG. 2 is a block diagram which shows a suspension control system of the invention.

Referring now to the drawings, particularly to FIGS. 1 and 2, a suspension control system according to the present invention is shown. This control system comprises generally four suspension units which include front-right, front-left, rear-right, and rear-left shock absorbers $SA_1$, $SA_2$, $SA_3$, and $SA_4$, vertical acceleration sensors 31 (hereinafter, referred to as a vertical G sensor), a steering sensor 32, a vehicle speed sensor 33, a brake sensor 34, step motors 35 for controlling damping positions of the shock absorbers respectively, and a control unit 30. The shock absorber as generally referred to will be hereafter represented by "SA"

The shock absorbers SA are disposed between a vehicle body and a suspension member rotatably supporting a road wheel. The vertical G sensors 31 are mounted on portions of the vehicle body adjacent the shock absorbers for monitoring vertical accelerations acting on the vehicle body respectively to provide signals indicative thereof to the control unit 30. The steering sensor 32 is attached to a steering wheel ST to monitor a steered angle of the steering wheel corresponding to an actual steered angle of the front wheels. The vehicle speed sensor 33 may be provided with a speedometer which detects vehicle speed. The brake sensor 34 is arranged to detect braking operation. The control unit 30 is arranged adjacent a driver's seat and is operable to provide control signals to the step motors 35 for modifying damping force characteristics of the shock absorbers SA respectively to suppress vehicle attitude change.

The control unit 30 includes an interface circuit 30a, a CPU (Central Processing Unit) 30b, and a driver 30c. Sensor signals from the vertical G sensors 31, the steering sensor 32, the vehicle speed sensor 33, and the brake sensor 34 are input to the interface circuit 30a.

Figure 3:
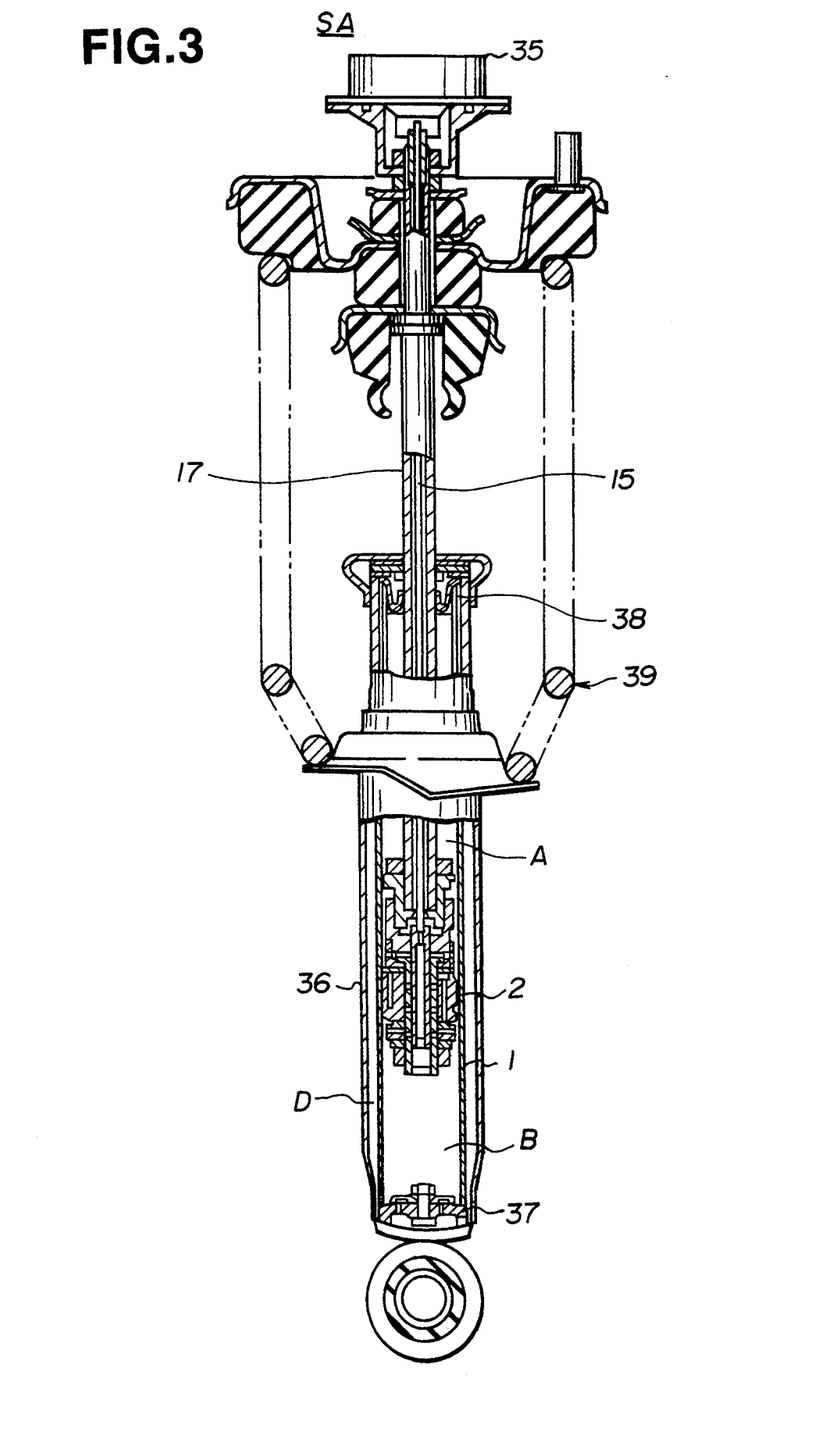
FIG. 3 is a cross-sectional view which shows a variable damping force shock absorber SA utilized for suppressing vehicle attitude change.

Referring to FIG. 3, a cross-sectional structure of the shock absorber SA is shown. The shock absorber SA includes an inner cylinder 1, a piston 2 for defining an upper chamber A and a lower chamber B, an outer cylinder 36 for defining a reservoir chamber D between the outer cylinder 36 and the inner cylinder 1, a base or bottom member 37 for defining the lower chamber B and the reservoir chamber D, a guide member 38 for guiding slide movement of a piston rod 17 linked to the piston 2, a suspension spring 39 interposed between a flange installed on the outer cylinder 36 and the vehicle body, and the step motor 35 for rotating a control rod 15.

Figure 4:
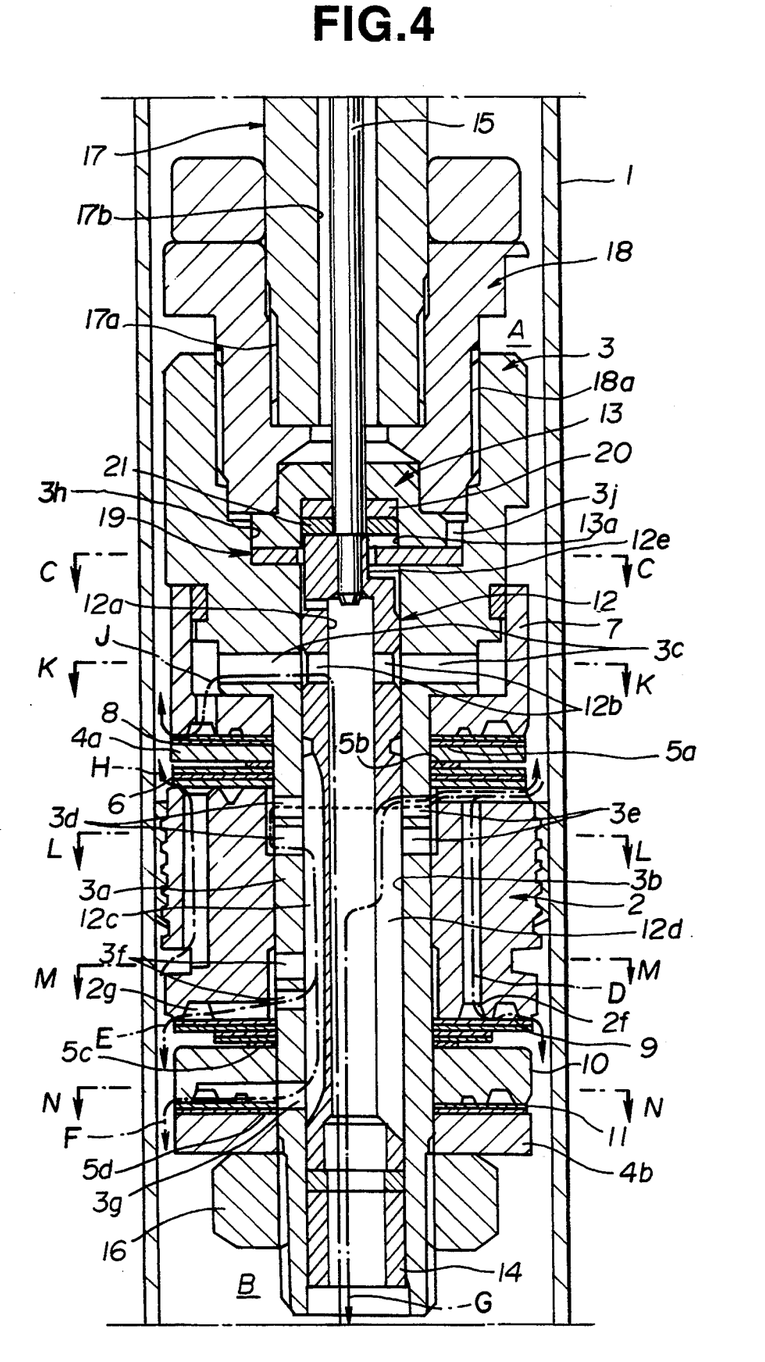
FIG. 4 is an enlarged cross-sectional view which shows a piston assembly having variable orifices for modifying damping force characteristics of a shock absorber.

Referring to FIG. 4, there is shown a cross-sectional structure of the piston 2. The piston 2 is connected to a tip end portion 3a of a stud 3 which is attached to an external threaded portion 18a of a rebounding motion stopper 18 into which a top portion 17a of the piston rod 17 is screwed. In assembly, after mounting the control rod 15 within the piston rod 17, a compression check body 7, a compression check valve 8, a washer 5a, a collar 4a, a washer 5b, compression damping valve 6, the piston 2, an extension damping valve 9, a washer 5c, an extension check body 10, an extension check valve 11, a washer 5d, and a collar 4d are installed on the tip end portion 3a of the stud 3 in regular sequence. A nut 16 is then fastened to the tip end portion 3a.

The stud 3 has an axial hollow portion 3b which extends therethrough along its center line. A first port 3c, a second port 3d, a third port 3e, a fourth port 3f, and a fifth port 3g are formed to communicate with the axial hollow portion 3b. The second port 3d and the third port 3e are aligned with each other over the axial hollow portion 3b. The second port 3d and the fourth port 3f are oriented in the same radial direction, while the other ports (i.e., the first, third, and fifth ports 3c, 3e, and 3g) are, as can be best seen in FIGS. 7 to 9, oriented in different radial directions.

A cylindrical adjusting pin 12 is rotatably disposed in the hollow portion 3b of the stud 3 and retained by ring-shaped upper and lower bushings 13 and 14. The adjusting pin 12 has a hollow portion 12a, a lateral hole 12b, a vertical groove 12c, and an axial slot 12d. The hollow portion 12a is communicated with the lower chamber B through its lower end portion. The lateral hole 12b is arranged to selectively establish fluid communication between the first port 3c and the hollow portion 12a according to its angular position. Likewise, the vertical groove 12c selectively establishes fluid communication among the second, fourth, and fifth ports 3d, 3f, and 3g. The axial slot 12d selectively communicates between the third port 3e and the hollow portion 12a.

The shock absorber SA is arranged to have four passages between the upper chamber A and the lower chamber B as fluid flow communicable passages during an extension or rebounding stroke:

1) a first extension phase passage D directing fluid flow to the lower chamber B from an inner groove 2f through an extension damping valve 9;
2) a second extension phase passage E directing fluid flow from the second port 3d, the vertical groove 12c, and the fourth port 3f to the lower chamber B through the outer periphery of the extension damping valve 9;
3) a third extension phase passage F directing fluid flow from the second port 3d, the vertical groove 12c, and the fifth port 3g to the lower chamber B via the opened extension check valve 11; and
4) a bypass flow passage G directing fluid flow from the third port 3e to the lower chamber B through the axial slot 12d and the hollow portion 12a.

For the compression phase or during a bounding stroke of the shock absorber SA, the following three passages are provided as the fluid flow passages:

1) a first compression phase flow passage H directing fluid flow from the lower chamber B to the upper chamber A through the opened compression damping valve 6;
2) a second compression phase flow passage J directing fluid flow from the hollow portion 12a, the lateral hole 12b, and the first port 3c to the upper chamber A through the opened compression check valve 8; and
3) a bypass flow passage G directing fluid flow from the hollow portion 12a, the axial slot 12d and the third port 3e to the upper chamber A.

The stud 3 has in its upper end a recessed portion 3h which is greater in diameter than the hollow portion 3b. An upper bushing 13 and a stopper plate 19 are retained between annular bottom surfaces of the recessed portion 3h and the rebounding motion stopper 18. The upper bushing 13 houses in its bore 13a a thrust washer 20 made of a low friction plate and a thrust washer 21 made of a metal plate in contact with an upper end surface of the adjusting pin 12.

Figure 5:
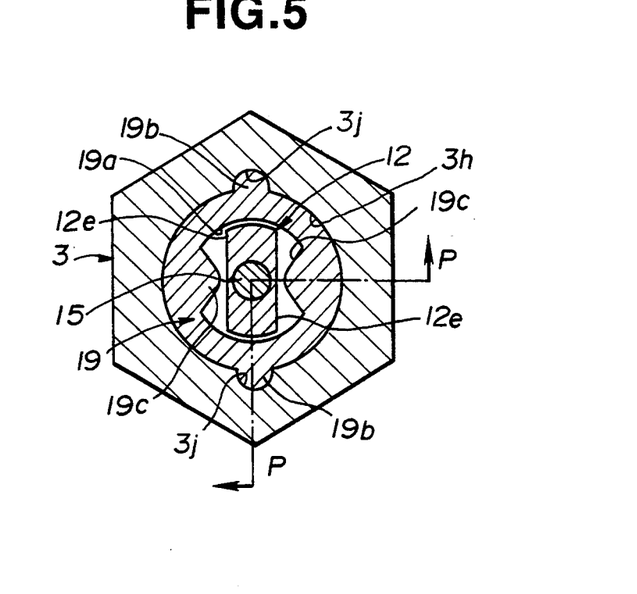
FIG. 5 is a cross-sectional view taken along the line C—C in FIG. 4 which shows a relation between an adjusting pin and stoppers.
Figure 6:
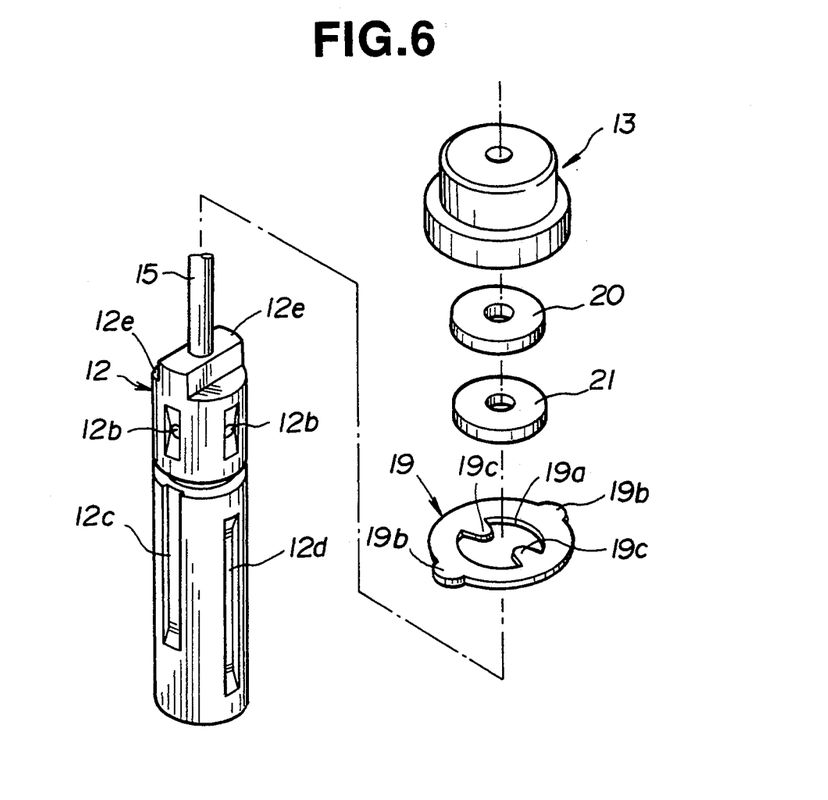
FIG. 6 is an exploded perspective view which shows an adjusting pin and stoppers.

Referring to FIGS. 5 and 6, the stopper plate 19 serves to restrict angular movement of the adjusting pin 12 so that the step motor 35 is set to an original, or starting position. The stopper plate 19 includes a center hole 19a into which the adjusting pin 12 is inserted, semicircular stopper portions 19c which are formed on an inner periphery and diametrically opposed to each other, and semicircular projections 19b which are formed on an outer periphery and diametrically opposed to each other. Semicircular notches 3j are drilled in an inner wall of the recessed portion 3h of the stud 3 so as to engage with the projections 19b.

An upper end portion of the adjusting pin 12 is machined to form a pair of shoulder portions having parallel flat surfaces 12e. The adjusting pin 12 is allowed to rotate within a range between the stopper portions 19c of the stopper plate 19, and its rotation is restricted by engagements of tile flat surfaces 12e with the stopper portions 19c respectively. The control rod 15 extends through a hollow portion 17b of the piston rod 17 to the step motor 35.

Figure 7A:
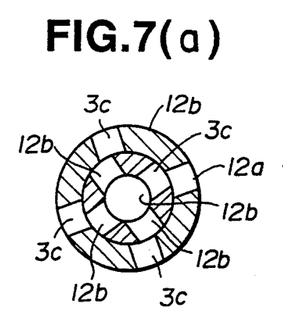
Figure 7B:
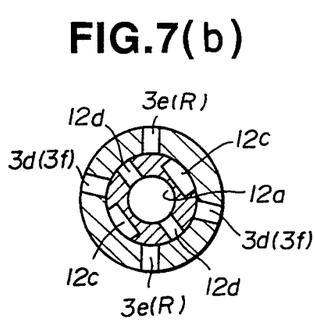
Figure 7C:
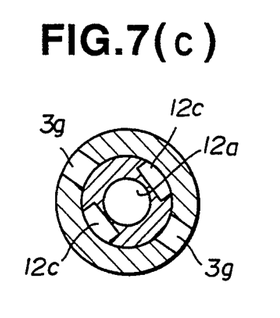
Figure 8A:
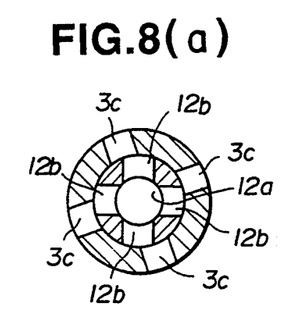
Figure 8B:
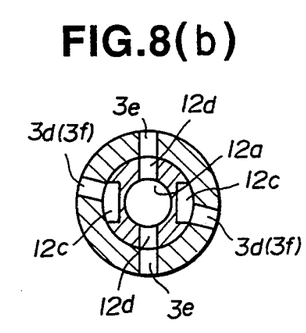
Figure 8C:
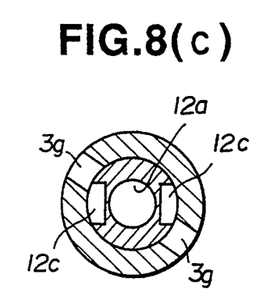
Figure 9A:
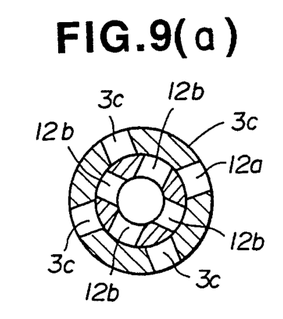
Figure 9B:
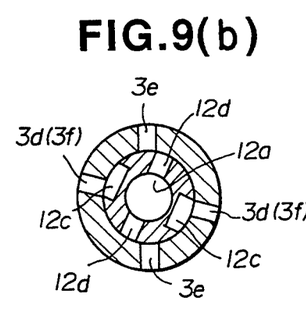
Figure 9C:
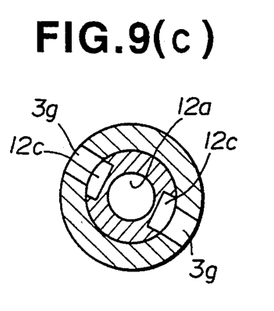

With the above arrangements, rotation of the step motor 35 causes the adjusting pin 12 to rotate, varying a damping coefficient of the shock absorber SA at multiple stages, as shown in FIGS. 7 to 9, within a range from the lowest damping coefficient (hereinafter, referred to as a softer damping position) to the highest damping coefficient (hereinafter, referred to as a harder damping position) during bounding and rebounding strokes.

Figure 10:
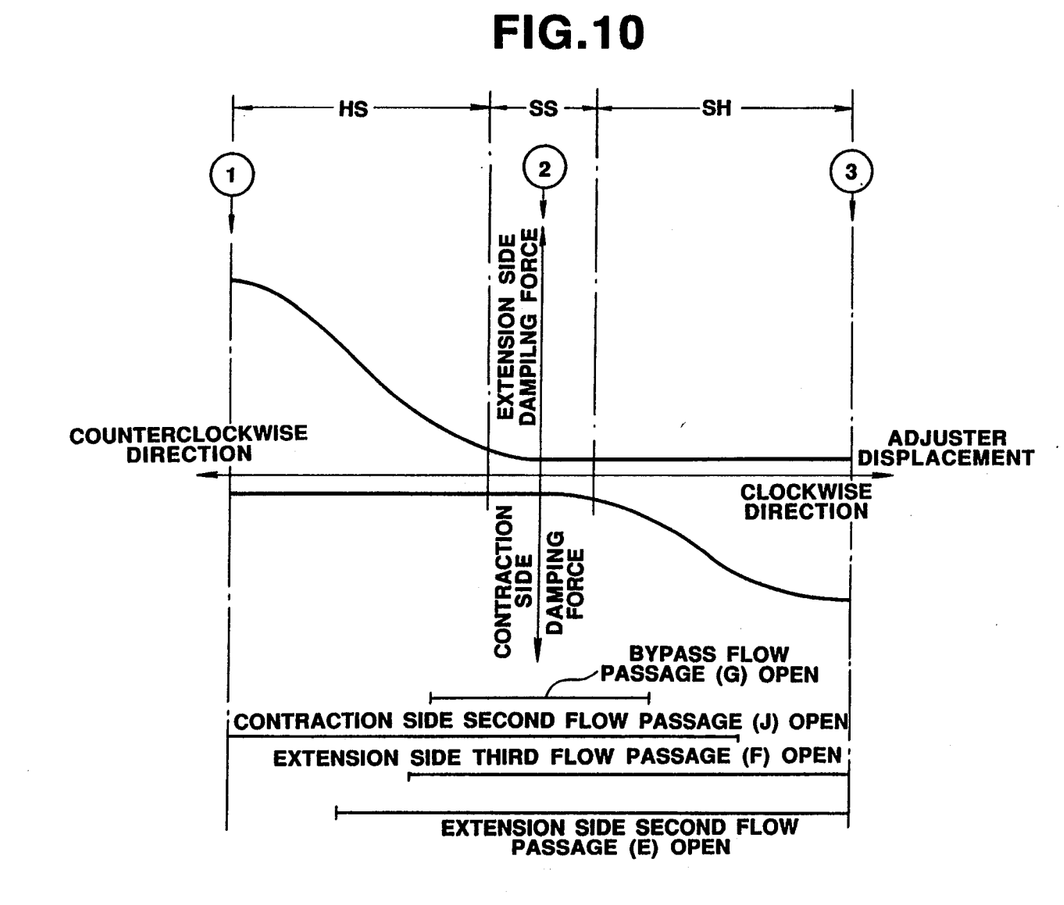
FIG. 10 is a graph which shows a relation between an angular position of an adjusting pin and damping force characteristics of a shock absorber.

Referring to FIG. 10, a relation between a position of the adjusting pin 12 and damping force characteristics of the shock absorber SA is shown. When the adjusting pin 12 is rotated in a counterclockwise direction from the position ② (in a softer damping range SS wherein the lowest damping coefficients are established during both bounding and rebounding strokes) to the position ①, the damping coefficient is increased toward the harder damping position (in a rebounding harder damping range HS) only in the rebounding stroke (i.e., during extension). Alternatively, rotating the adjusting pin 12 in a clockwise direction to the position ③ causes the damping coefficient to change toward the harder damping position (in a bounding harder damping range SH) only in the bounding stroke (i.e., during compression) without any change in the rebounding stroke.

It will be noted that, in FIG. 10, when the adjusting pin 40 is rotated and halted at the three positions ①, ②, and ③, the cross-sectional situations of the adjusting pin taken along the lines K—K, M—M, and N—N are shown in FIGS. 7(A), 8(A), and 9(A), FIGS. 7(B), 8(B), and 9(B), and FIGS. 7(C), 8(C), and 9(C), respectively.

Figure 11:
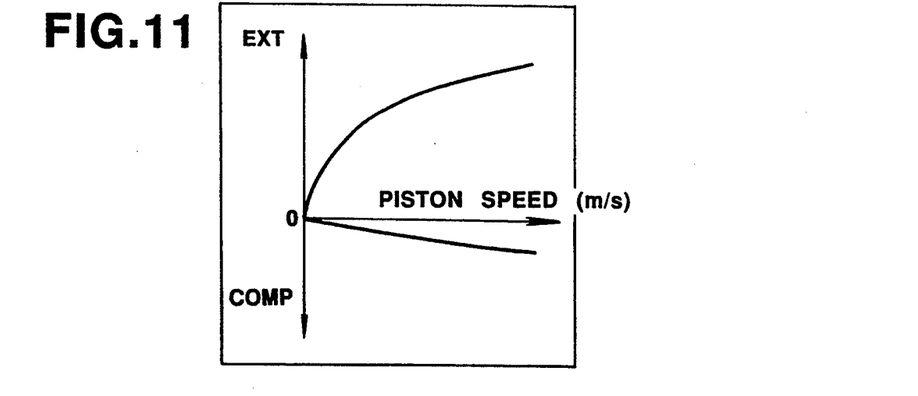
FIGS. 11, 12, and 13 are graphs which show relations between piston speed and damping force when an adjusting pin is arranged at positions ①, ②, and ③ as shown in FIG. 10, respectively.
Figure 12:
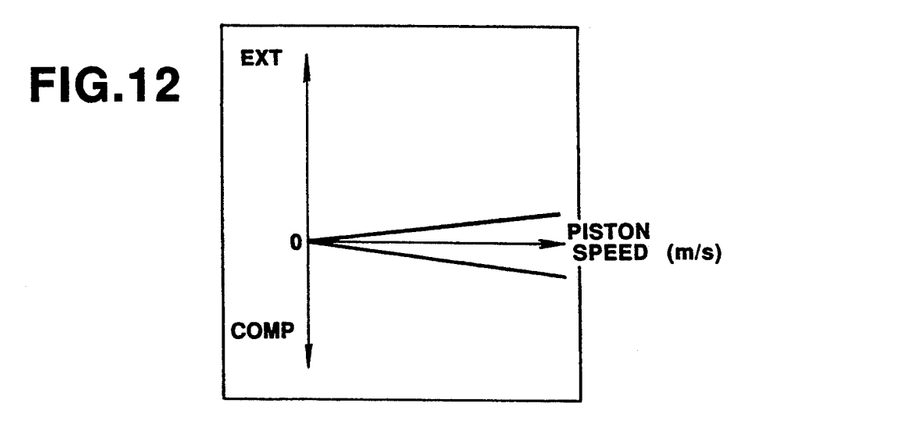
Figure 13:
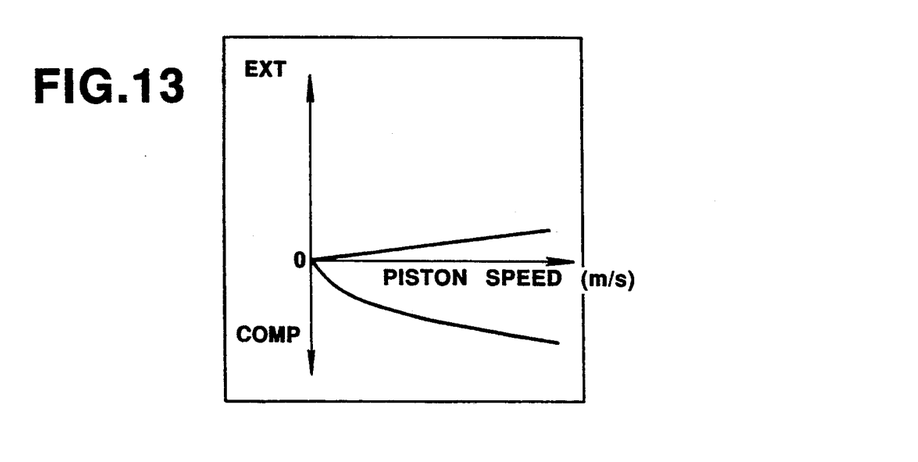

In addition, the damping force characteristics at the positions ①, ②, and ③ of the adjusting pin 12 are shown in FIGS. 11, 12, and 13, respectively.

In this embodiment, when an ignition switch is turned on to initiate damping force modification control, or when a vehicle is stopped, the step motor 35 is initialized to its home, or original position in the following manner. First, the adjusting pin 12 is, as can be seen from FIG. 5, rotated to a position where the flat surfaces 12e engage the stopper portions 19c respectively. From this position, the step motor 35 is reversed by preselected steps to be set at the original position. After this initialization, the step motor 35 is driven by preselected steps in a given direction to assume the damping force characteristics at the positions ①, ②, and ③.

Figure 14:
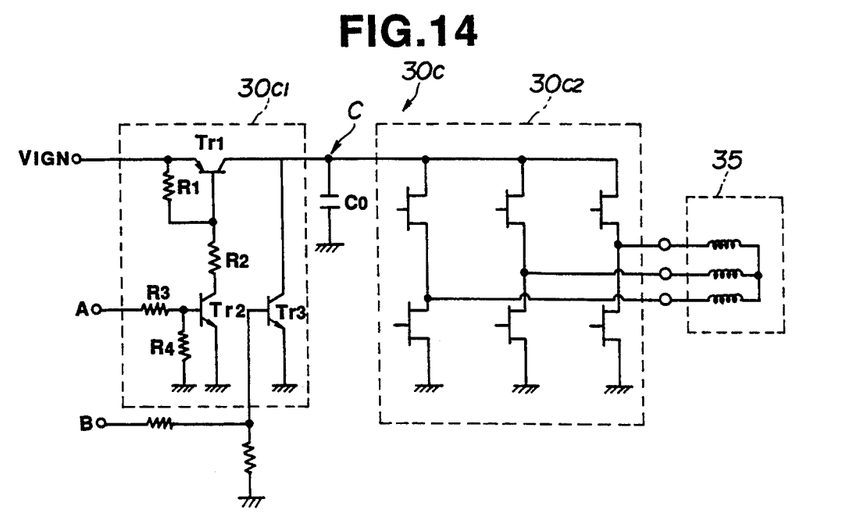
FIG. 14 is a circuit diagram which shows a power control system for an electric motor of a shock absorber.

Referring to FIG. 14, there is shown the driver 30c of the control unit 30. The driver 30c includes a power switching circuit 30c1 and a driving circuit 30c2. The power switching circuit 30c1 includes switching transistors $T_{r1}$, $T_{r2}$, and $T_{r3}$, resistors $R_1$, $R_2$, and $R_3$, and a capacitor $C_O$. The operating current is always supplied from a battery to the power switching circuit 30c1 through a terminal $V_{IGN}$.

With the above arrangements, when voltage is applied to a terminal A with no voltage being applied to a terminal B, the transistor $T_{r3}$ is de-energized, while the transistor $T_{r2}$ is energized, thereby energizing the transistor $T_{r1}$. The transistor $T_1$ thus produces a current flow from the terminal $V_{IGN}$ to the driving circuit 30c2 through the capacitor $C_O$. The capacitor $C_O$ then stores the operating current.

Alternatively, when the voltage is applied to the terminal B with no voltage being applied to the terminal A, the transistor $T_{r2}$ is de-energized, while the transistor $T_{r3}$ is energized, thereby de-energizing the transistor $T_{r1}$. The terminal $V_{IGN}$ is then connected to the ground through the resistors $R_1$ and $R_2$ and the transistor $T_{r2}$. The capacitor $C_O$ is then discharged to the ground through the transistor $T_{r3}$ so that the voltage to the driving circuit 30c2 (i.e., at a point C) is decreased gradually.

Figure 15:
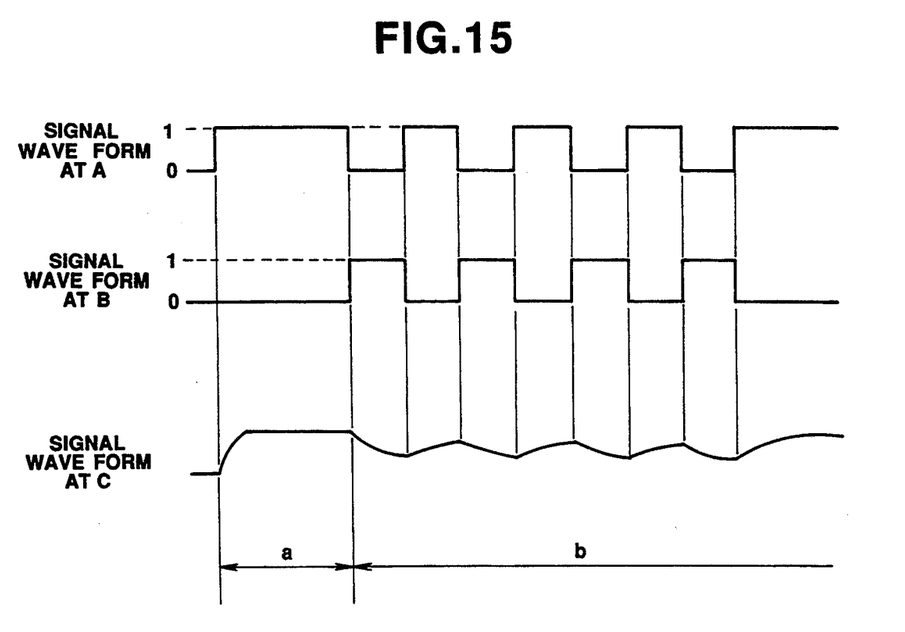
FIG. 15 is a time-chart which shows signal operation of a power control system for an electric motor of a shock absorber.
Figure 17:
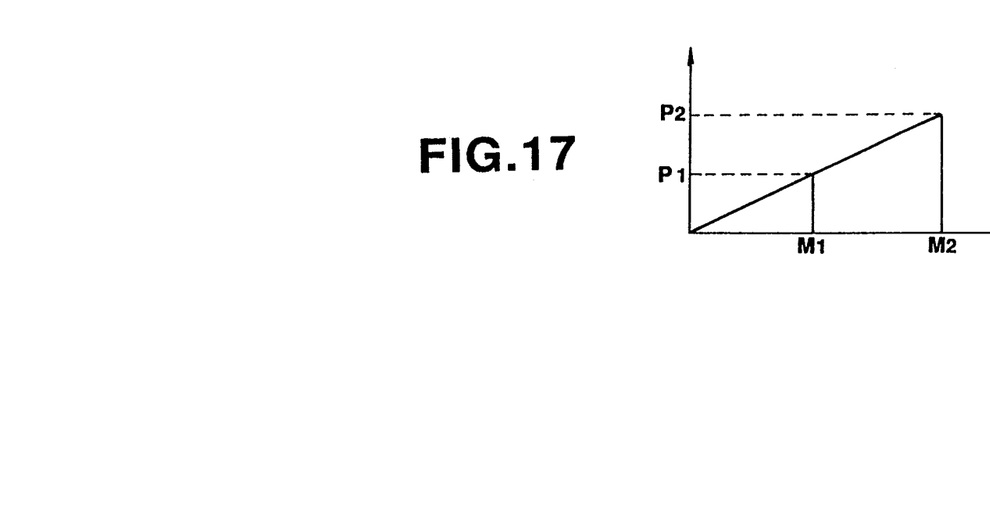
FIG. 17 is a graph which shows a relation between torsion of an adjusting pin and operating torque of an electric motor of a shock absorber.

During normal operation of the damping force modification control, the transistor $T_{r1}$ is energized to produce the current flow therethrough so that all of the operating current input to the terminal $V_{IGN}$ is supplied to the driving circuit 30c2, as shown in a region a of FIG. 15. The step motor 35 thus produces a maximum driving torque $P_2$ as shown in FIG. 17.

When the step motor 35 is initialized, the transistor $T_{r1}$ is switched alternately between the energized state and the de-energized state, as shown in a region b of FIG. 15 so that an averaged voltage level supplied to the driving circuit 30c2 is decreased. This results in the driving torque of the step motor 35 being reduced to $P_1$ as shown in FIG. 17.

Figure 16A:
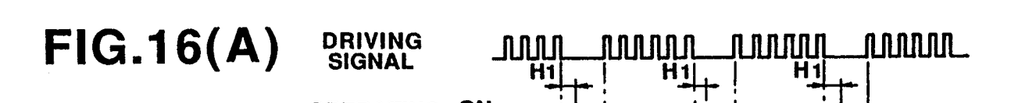
FIG. 16 is a time-chart which shows operation initializing an angular position of an electric motor of a shock absorber.
Figure 16B:
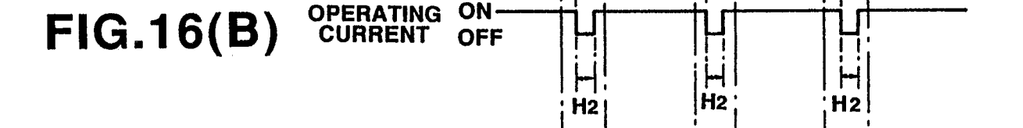
Figure 16C:
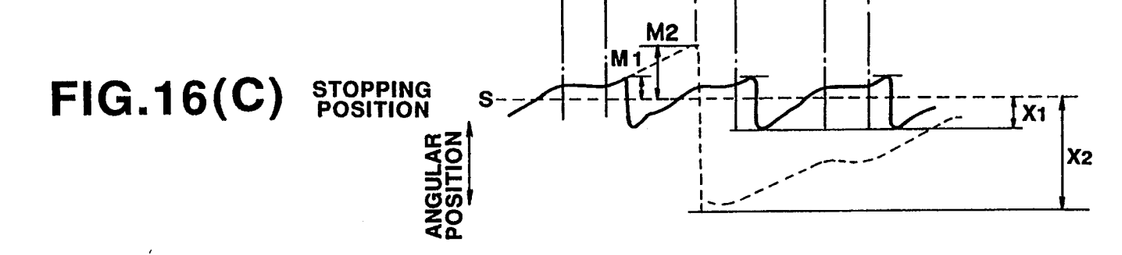

FIGS. 16(a)-16(c) show a time-chart which represents the relation among the driving signal (FIG. 16(A)) for rotating the step motor 35, the operating current (FIG. 16(B)) to the driving circuit 30c2, and an angular position (FIG. 16(C)) of the adjusting pin 12. The stopper position S represents a position where both the flat surfaces 12e of the adjusting pin 12 engage the stopper portions 19c.

As shown in the time-chart, when the ignition switch of the vehicle is turned on, the driving signals are input to the step motor 35 for initialization. These driving signals are provided with a plurality of pulse trains. The total number of pulses is set to a number which enables the adjusting pin 12 to rotate over the rotational allowable range defined between the stopper portions 19c as shown in FIG. 5. It will be thus noted that the adjusting pin 12 must engage the stopper portions 19c once at least until the total number of pulses has been outputted.

After each pulse train (e.g., six pulses) is outputted, an angular position of the step motor 35 is held for a period of time $H_1$ due to the activity of the capacitor $C_O$. The operating current is then shut off for a period of time $H_2$ so that the step motor 35 is de-energized to provide no driving torque.

With the above control, when the adjusting pin 12 engages the stopper portions 19c during a period the first pulse train is outputted, the step motor 35 is, as shown in FIG. 16(C), run slightly over the stopping position S, twisting the control rod 15. Upon the driving signals being stopped outputting, the step motor 35 is held against reaction forces from the stopper portions 19c for the period of time $H_1$. When the operating current to the step motor 35 is then shut off for the period of time $H_2$, the torque of the step motor 35 drops to about zero so that the adjusting pin 12 is returned to the stopper position S slowly. However, in the case of a small amount of torsion of the control rod 15, as shown in FIG. 16(C), the adjusting pin 12 remains in its position. After the period of time $H_2$, when the driving signals are provided again, the step motor 35 is further rotated against the reaction forces of the stopper portions 19c, increasing the torsion of the control rod 15. When the reaction forces acting on the control rod 15 exceed a value $M_1$ which corresponds to the driving torque $P_1$ of the step motor 35, the step motor 35 is returned suddenly over the stopping position S by an angle $X_1$ due to the loss of synchronism peculiar to a step motor, and rotated again toward the stopper portions 19c as long as the driving signals are outputted.

After the above initializing operation of the step motor 35, shutting off the operating current causes the driving torque of the step motor 35 to be reduced to about zero so that the adjusting pin 12 is moved to within an allowable positional range across the stopping position S as a result of the reaction forces from the stopper portions 19c. Afterwards, a preselected number of pulses is input to the step motor 35 to move it to the original position.

A broken line, as shown in FIG. 16(C), represents the positional variation of the step motor 35 when the step motor 35 is initialized with normal operating torque which is utilized for the damping force modification control. In this case, the torsion of the control rod 15 becomes increased to a value of $M_2$ which corresponds to the driving torque $P_2$ of the step motor 35. Thus, when the torsion of the control rod 15 reaches $M_2$, the adjusting pin 12 is returned over the stopping position S by an angle $X_2$ which is much greater than the angle $X_1$.

As described above, in this embodiment, when the step motor 35 is initialized, the driving torque of the step motor 35 is reduced below a preselected level so as to decrease the reaction forces acting on the control rod 15 from the stopper portions 19c to within a range assuring allowable positioning accuracy. Additionally, the driving signals are stopped outputting before the step motor 35 is de-energized temporarily. Thus, even if resonance frequency of the step motor 35 substantially corresponds to that of the control rod 15, the vibration of the step motor 35 is reduced greatly.

Figure 18:
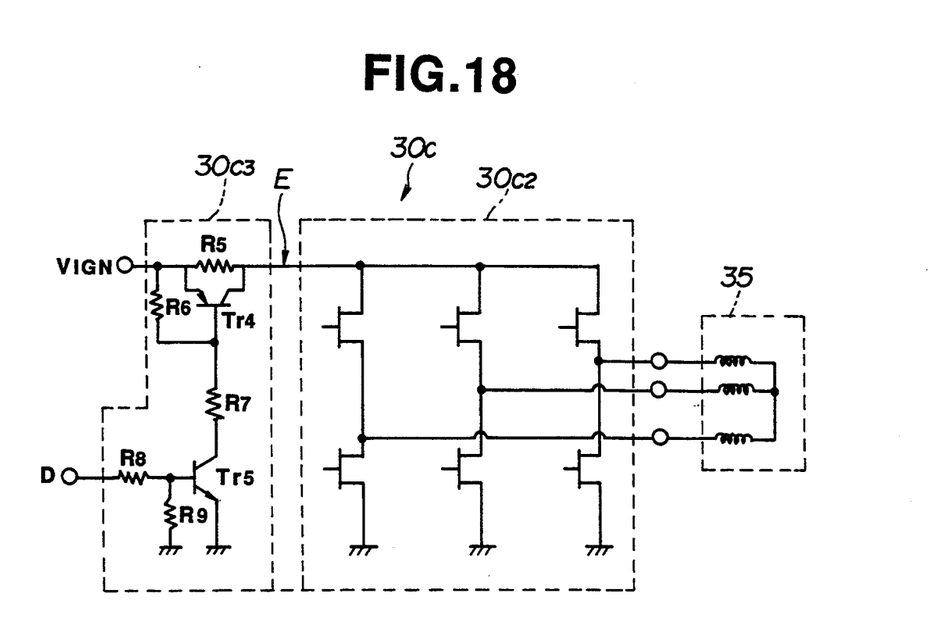
FIG. 18 is a circuit diagram which shows an alternative embodiment of a power control system for an electric motor of a shock absorber.
Figure 19:
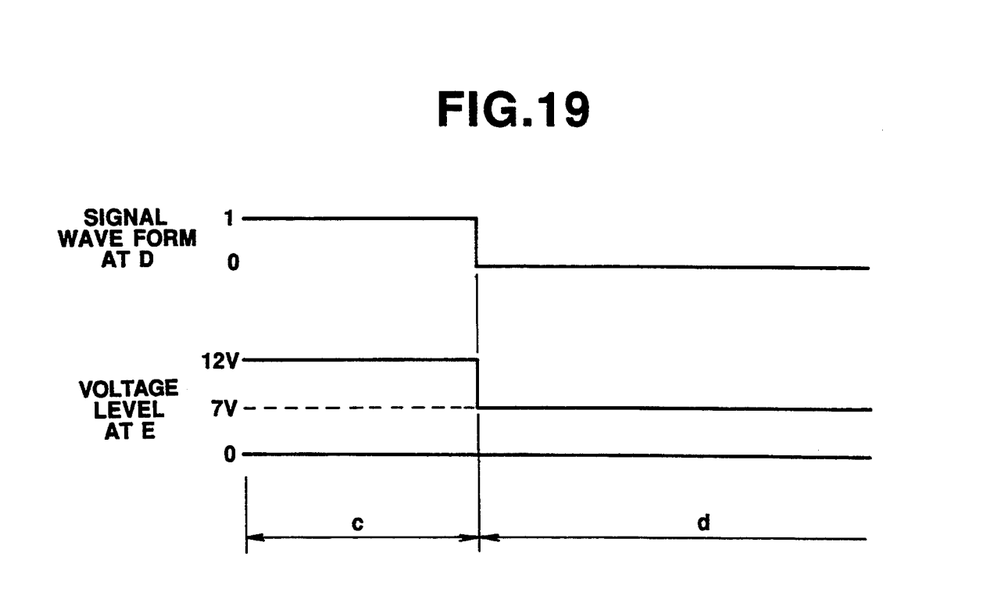
FIG. 19 is a time-chart which shows operation of a power control system of an alternative embodiment.

Referring to FIGS. 18 and 19, an alternative embodiment of the driver 30c is shown. The driver 30c of this embodiment includes a driving voltage control circuit 30c3 in place of the power switching circuit 30c1 in the first embodiment.

The driving voltage control circuit 30c3 includes switching transistors $T_{r4}$ and $T_{r5}$ and resistors $R_5$, $R_6$, $R_7$, $R_8$, and $R_9$. An operating power of 12 V is always applied to a terminal $V_{IGN}$.

With the above arrangements, when voltage is applied to a terminal D, the transistor $T_{r5}$ is energized, thereby energizing the transistor $T_{r4}$. The transistor $T_{r4}$ thus provides the operating power of 12 V to the driving s circuit 30c2 by-passing the resistance $R_5$.

Alternatively, when the applied voltage is removed from the terminal D, the transistor $T_{r4}$ is de-energized, thereby de-energizing the transistor $T_{r5}$. The operating power from the terminal $V_{IGN}$ is supplied to the driving circuit 30c2 through the resistor $R_5$, resulting in voltage dropping across the resistor $R_5$. A voltage level at a point E is thus decreased to a preselected level (e.g., 7 V) as shown in FIG. 19.

In this embodiment, during normal operation of the damping force modification control, the transistor $T_{r4}$ is energized to provide the operating power of 12 V to the driving circuit 30c2, as shown in the region c of FIG. 19. The step motor 35 thus produces a maximum driving torque P2 as shown in FIG. 17.

During initializing operation of the step motor 35, the transistor $T_{r4}$ is de-energized to provide the operating power of 7 V to the driving circuit 30c2, as shown in the region d of FIG. 19. Thus, the driving torque of the step motor 35 is reduced to $P_1$ as shown in FIG. 17.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as set forth in the appended claims.

What is claimed is:

1. A suspension control system for an automotive vehicle comprising:

a shock absorber disposed between a vehicle body and a suspension member rotatably supporting a wheel, said shock absorber being controllable to assume damping force characteristics in a range between preselected higher and lower damping coefficients over extension and compression strokes;

an adjusting member, disposed in said shock absorber, movable for modifying the damping force characteristics of said shock absorber;

a motor providing driving torque of a preselected operating level to said adjusting member to move said adjusting member for modifying the damping force characteristics;

a stopper restricting the movement of said adjusting member at a preselected position when said motor is initialized; and motor driving controlling means for controlling the driving torque provided from said motor to said adjusting member, said motor driving controlling means reducing the driving torque to a level lower than the preselected operating level when said motor is initialized.

2. A suspension control system as set forth in claim 1, wherein said motor is provided with a step motor, said motor driving controlling means providing a plurality of pulse trains for rotating said step motor into engagement with said stopper when the step motor is initialized.

3. A suspension control system as set forth in claim 2, wherein the reduced driving torque during initializing operation of said step motor is maintained for a preselected first period of time after each output of the pulse train is stopped, after the first period of time, the reduced driving torque is further decreased to about zero for a preselected second period of time.

4. A suspension control system as set forth in claim 2, wherein said adjusting member is connected to an output shaft of said step motor, said stopper includes a ring plate having a hole into which said adjusting member is inserted, said ring plate further having protrusions in the hole which are diametrically opposed to each other for restricting rotation of the adjusting member.

5. A suspension control system as set forth in claim 4, wherein the protrusions in the hole of the stopper defines a rotational range within which the adjusting member is rotated with the driving torque of the preselected operating level for modifying the damping force characteristics, a total number of pulses provided by said motor driving controlling means being set to a number enabling the step motor to rotate over the rotational range defined between the protrusions of the stopper.

* * * * *